United States Patent
Burdeniuc et al.

(10) Patent No.: US 11,098,198 B2
(45) Date of Patent: Aug. 24, 2021

(54) SILOXANE-OXYALKYLENE COPOLYMER SURFACTANT COMPOSITIONS

(71) Applicant: Evonik Operations GmbH, Essen (DE)

(72) Inventors: Juan Jesus Burdeniuc, Colmar, PA (US); Udo Banseberg, Stadtlohn (DE)

(73) Assignee: Evonik Operations GmbH, Essen (DE)

( * ) Notice: Subject to any disclaimer, the term of this patent is extended or adjusted under 35 U.S.C. 154(b) by 314 days.

(21) Appl. No.: 16/088,152

(22) PCT Filed: Apr. 12, 2017

(86) PCT No.: PCT/US2017/027205
§ 371 (c)(1),
(2) Date: Sep. 25, 2018

(87) PCT Pub. No.: WO2017/180741
PCT Pub. Date: Oct. 19, 2017

(65) Prior Publication Data
US 2020/0255665 A1    Aug. 13, 2020

Related U.S. Application Data

(60) Provisional application No. 62/321,363, filed on Apr. 12, 2016.

(51) Int. Cl.
| | |
|---|---|
| *C08G 18/36* | (2006.01) |
| *C08G 18/48* | (2006.01) |
| *C08G 18/61* | (2006.01) |
| *C08G 18/76* | (2006.01) |
| *C08L 83/12* | (2006.01) |

(52) U.S. Cl.
CPC .............. *C08L 83/12* (2013.01); *C08G 18/36* (2013.01); *C08G 18/4837* (2013.01); *C08G 18/61* (2013.01); *C08G 18/7621* (2013.01); *C08G 2110/005* (2021.01); *C08G 2110/0008* (2021.01)

(58) Field of Classification Search
None
See application file for complete search history.

(56) References Cited

U.S. PATENT DOCUMENTS

| | | | |
|---|---|---|---|
| 4,394,491 A | 7/1983 | Hoffman | |
| 5,489,617 A * | 2/1996 | Miller .................... | C08G 77/46 521/112 |
| 5,807,903 A | 9/1998 | Stanga et al. | |
| 5,830,970 A | 11/1998 | Cobb et al. | |

(Continued)

FOREIGN PATENT DOCUMENTS

| | | | |
|---|---|---|---|
| CN | 1159455 A | 9/1997 | |
| CN | 103003324 A | 3/2013 | |
| EP | 1845121 A1 | 10/2007 | |
| WO | 0158976 A1 | 8/2001 | |
| WO | 03016372 A1 | 2/2003 | |
| WO | 03016373 A1 | 2/2003 | |
| WO | 03055930 A1 | 7/2003 | |
| WO | 2004060956 A1 | 7/2004 | |
| WO | WO-2006047433 A1 * | 5/2006 | ............. C08G 18/36 |
| WO | 2006116456 A1 | 11/2006 | |

OTHER PUBLICATIONS

PCT International Search Report dated Jul. 12, 2017 corresponding to PCT Application No. PCT/US2017/027205 filed Apr. 12, 2017 (10 pages).

M. Renkin, et al; Rapeseed Methyl ester Ethoxylates: A New Class of Surfactants of Environmental and Commercial Interest; XP-001235608; Tenside Surf. Det. vol. 42 No. 5; Sep. 1, 2005; pp. 280-287 (8 pages).

*Primary Examiner* — Melissa A Rioja
(74) *Attorney, Agent, or Firm* — Andrew H. Chung; Linda S. Li; Jason S. Ngui

(57) ABSTRACT

Siloxane-oxyalkylene copolymer surfactants in combination with alkyl esters of fatty acids are disclosed. Alkyl esters of fatty acids are represented by the general formula Z—COO—Y where Z is a saturated or unsaturated $C_{10-24}$ alkyl or alkylene group and Y is typically a $C_{1-6}$ alkyl, alkylene linear or branched group. The siloxane-oxyalkylene copolymer surfactants that are typically used with the fatty esters have the general formula $MD_xD'_yM$ wherein M represents $(CH_3)_3SiO_{1/2}$ or $R(CH_3)_2SiO_{1/2}$, D represents $(CH_3)_2SiO_{2/2}$, D' represents $(CH_3)RSiO_{2/2}$, and the value of x+y is from 50 to 220, and the ratio x/y is from 5 to 15 inclusive. In the above formulae for M and D', R is a polyether-containing substituent. The siloxane-oxyalkylene copolymer surfactants used in conjunction with the fatty ester contains a major fraction (60-80 wt. %) of siloxane-oxyalkylene with one pendant R typically defined as $C_nH_{2n}O(C_2H_4O)_a(C_3H_6O)_bR'$ moieties having weight average molecular weights of from about 1400-2000 and wherein n is 1-4 and typically 3, the values of "a" are in the range 12-22 and typically 16-20 and the values of "b" are in the range of 12-22 and typically 16-20, R' typically represent acyl group —C(O)CH_3. The surfactant of the invention also contains a minor fraction of a siloxane-oxyalkylene copolymer (6-10 wt. %) having two pendant R typically defined as $C_nH_{2n}O(C_2H_4O)_a(C_3H_6O)_bR'$ moieties having average molecular weights of about 1000-3500 and wherein n is 1-4 and typically 3, the values of "a" are in the range 8-40 and typically 10-35 and the values of "b" are in the range of 8-40 and typically 10-35, R' typically represent acyl group $C(O)CH_3$.

11 Claims, No Drawings

(56) References Cited

U.S. PATENT DOCUMENTS

| | | | | |
|---|---|---|---|---|
| 5,877,268 A | * | 3/1999 | Jorgenson | C08G 65/2663 |
| | | | | 528/15 |
| 5,981,613 A | * | 11/1999 | Cobb | C08G 18/4837 |
| | | | | 521/112 |
| 6,121,336 A | * | 9/2000 | Okoroafor | C08J 9/0061 |
| | | | | 521/112 |
| 8,044,109 B2 | * | 10/2011 | Gu | C08G 18/7621 |
| | | | | 521/112 |
| 2010/0286295 A1 | | 11/2010 | Heisler et al. | |
| 2013/0241098 A1 | | 9/2013 | Anjum et al. | |
| 2018/0179322 A1 | * | 6/2018 | Kiss | C08L 83/12 |

* cited by examiner

SILOXANE-OXYALKYLENE COPOLYMER SURFACTANT COMPOSITIONS

This Application is a § 371 national stage of PCT International Application No. PCT/US2017/027205, filed Apr. 12, 2017, which claims the benefit of U.S. Application No. 62/321,363, filed Apr. 12, 2016, the contents of each of which are hereby incorporated by reference in their entirety into this application.

FIELD OF THE INVENTION

The present invention relates to siloxane-oxyalkylene copolymer surfactants used in combination with alkyl esters of fatty acids. The inventive surfacants are useful for making polyurethanes including polyurethane foams.

BACKGROUND OF THE INVENTION

In polyurethane foam manufacturing, surfactants are required to stabilize the foam until viscosity of the polymer-forming chemical reactions are sufficiently high so that the foam is self-supporting and does not suffer total or partial collapse. The present invention is an improvement over conventional compositions and comprises silicone polyether surfactants for polyurethane foam manufacture having siloxane backbones and pendant polyether groups used in combination with fatty acid esters to provide optimum balance between foam rise kinetics, foam height, uniform air flows and density distribution as well as minimum shrinkage.

BRIEF SUMMARY OF THE INVENTION

The present invention provides surfactants made by a combination of siloxane-oxyalkylene copolymer surfactants when used in combination with alkyl esters of fatty acids which provide excellent emulsification, efficiency and broad processing latitude in the formation of flexible polyurethane slabstock foams. According to measurements made on flexible slabstock foam such as rise time (defines as the time in seconds to reach 95% of its height), rise height (mm), setting (%) densities (Kg/m3) for top, middle and bottom layers as measured by ASTM D3574 Test A, air flows (liter/min) of top layer, middle layer and bottom layer as measured by ASTM D3574 Test G.

Moreover, flexible polyurethane slabstock foams produced with the surfactant of the present invention showed better foam heights, while maintaining finer cell structures, than foams produced with other conventional siloxane-oxyalkylene copolymer surfactants. The amount of surfactant can range from about 0.05 pphp to about 10 pphp.

One aspect of the present invention relates to siloxane-oxyalkylene copolymer surfactants when used in combination with alkyl esters of fatty acids. Alkyl esters of fatty acids are represented by the general formula Z—COO—Y where Z is a saturated or unsaturated $C_{10-24}$ alkyl or alkylene group (e.g., C14 to C24) and Y is typically a $C_{1-6}$ alkyl, alkylene linear or branched group.

The siloxane-oxyalkylene copolymer surfactants that can be used with the fatty acid esters have the general formula $MD_xD'_yM$ wherein M represents $(CH_3)_3SiO_{1/2}$ or $R(CH_3)_2SiO_{1/2}$, D represents $(CH_3)_2SiO_{2/2}$, D' represents $(CH_3)RSiO_{2/2}$, and the value of x+y is from 50 to 220, and the ratio x/y is from 5 to 15 inclusive. In the above formulae for M and D', R is a polyether-containing substituent. The siloxane-oxyalkylene copolymer surfactants of the invention contains a major fraction (60-80 wt. %) of siloxane-oxyalkylene with one pendant R typically defined as $C_nH_{2n}O(C_2H_4O)_a(C_3H_6O)_bR'$ moieties having weight average molecular weights of from about 1400-2000 and wherein n is 1-4 and typically 3, the values of "a" are in the range of 12-22 and typically 16-20, the values of b are in the range of 12-22 and typically 16-20, and R' typically represents the acyl group —C(O)CH$_3$. The siloxane-oxyalkylene copolymer surfactants of the invention also contains a minor fraction (6-10 wt. %) of siloxane-oxyalkylene with two pendant R typically defined as $C_nH_{2n}O(C_2H_4O)_a(C_3H_6O)_bR'$ moieties having weight average molecular weights of from about 1000-3500 and wherein n is 1-4 and typically 3, the values of "a" are in the range of 8-40 and typically 10-35, the values of "b" are in the range of 8-40 and typically 10-35, and R' typically represents the acyl group C(O)CH$_3$.

One aspect of the invention relates to the inventive surfactant and at least one diluent or solvent.

Another aspect of the invention relates to a composition comprising the inventive surfactant and at least one member selected from the group consisting of at least one polyol, at least one blowing agent and at least one catalyst.

A further aspect of the invention relates to a method for making foam comprising contacting at least one polyol and at least one isocyante while in the presence of the inventive surfactant.

One aspect of the invention relates to a polyurethane foam obtained by an inventive method.

The various aspects of the invention can be used alone or in combinations with each other.

DETAILED DESCRIPTION OF THE INVENTION

The present invention relates to siloxane-oxyalkylene copolymer surfactants for use in combination with alkyl esters of fatty acids. Alkyl esters of fatty acids can be represented by the general formula Z—COO—Y where Z is a saturated or unsaturated $C_{10-24}$ alkyl or alkylene group (e.g., C14 to C24) and Y is typically a $C_{1-6}$ alkyl, alkylene linear or branched group. The siloxane-oxyalkylene copolymer surfactants that can be used with the fatty acid esters have the general formula $MD_xD'_yM$ wherein M represents $(CH_3)_3SiO_{1/2}$ or $R(CH_3)_2SiO_{1/2}$, D represents $(CH_3)_2SiO_{2/2}$, D' represents $(CH_3)RSiO_{2/2}$, and the value of x+y is from 50 to 220 (e.g., from 50 to 220), and the ratio x/y is from 5 to 15 inclusive. The mass ratio of silicone surfactant to fatty acid esters can range from 9 to 1.3. In the above formulae for M and D', R is a polyether-containing substituent.

In one aspect of the invention, the surfactants of the invention comprise at least one member selected from the following components:

1) A major fraction (e.g., about 60 to about 80 wt. %) of siloxane-oxyalkylene with one pendant R typically defined as $C_nH_{2n}O(C_2H_4O)_a(C_3H_6O)_bR'$ moieties having weight average molecular weights of from about 1400-2000 and wherein n is 1-4 and typically 3, the values of "a" are in the range 12-22 and typically 16-20 and the values of "b" are in the range of 12-22 and typically 16-20, R' typically represent acyl group —C(O)CH$_3$.

2) A minor fraction (5-10 wt. %) of siloxane-oxyalkylene with two pendant R typically defined as $C_nH_{2n}O(C_2H_4O)_a(C_3H_6O)_bR'$ moieties having weight average molecular weights of from about 1000-3500 and wherein n is 1-4 and typically 3, the values of "a" are in the range 8-40 and typically 10-35 and the values of "b" are in the range of 8-40 and typically 10-35, R' typically represent acyl group C(O)CH$_3$.

3) Alkyl esters of fatty acids (15 wt. % to 30 wt. %) that can be represented by the general formula Z—COO—Y where Z is a saturated or unsaturated C$_{10-24}$ alkyl or alkylene group and Y is typically a C$_{1-6}$ alkyl, alkylene linear or branched group. Within the broad range of compositions of the invention as defined are a number of preferred materials. The preferred material can be made by the combination of 4 components which can be described as follows:

a. Alkyl esters of fatty acids can be represented by the general formula Z—COO—Y where Z is a saturated or unsaturated C$_{10-24}$ alkyl or alkylene group and Y is typically a C$_{1-6}$ alkyl, alkylene linear or branched group. The range of the fatty acid ester is typically 15 wt. % to 30 wt. % and preferably from 20 wt. % to 25 wt. %.

b. A first siloxane-oxyalkylene copolymer (SSF-1) surfactant having the general formula MD$_x$D'$_y$M wherein M represents (CH$_3$)$_3$SiO$_{1/2}$ or R(CH$_3$)$_2$SiO$_{1/2}$, D represents (CH$_3$)$_2$SiO$_{2/2}$, D' represents (CH$_3$)RSiO$_{2/2}$, and a DP (defined as the degree of polymerization and equal to x+y+2) value of in the range from 100 to 140 and preferably from 110 to 130 and the x/y ratio from 8 to 12 and more preferably from 9 to 11 and R is defined as a polyether-containing substituent selected from the group consisting of C$_n$H$_{2n}$O[C$_2$H$_3$(M)O]$_a$R' moieties, where M=H (from ethylene oxide) or Methyl (from propylene oxide), having weight average molecular weights of from about 700-2500 and wherein n is 1-4 and typically n=3, the value of "a" is in the range of 24 to 50 and more preferably 30 to 40 and where the EO/PO ratio is from 0.90 to 1.10 and more preferably from 1.0 to 1.05 and R' acyl group —C(O)CH$_3$. The wt. % of the first siloxane in the composition is typically 60 wt. % to 80 wt. % and preferably from 65 wt. % to 75 wt. %.

c. A second siloxane-oxyalkylene copolymer surfactant (SSF-2) having the general formula MD$_x$D'$_y$M wherein M represents (CH$_3$)$_3$SiO$_{1/2}$ or R(CH$_3$)$_2$SiO$_{1/2}$, D represents (CH$_3$)$_2$SiO$_{2/2}$, D' represents (CH$_3$)RSiO$_{2/2}$, and a DP (defined as the degree of polymerization and equal to x+y+2) value of in the range from 180 to 220 and preferably from 190 to 210 and the x/y ratio from 5 to 10 and more preferably from 6 to 8 and two pendant R groups which are defined as: 1) polyether-containing substituent selected from the group consisting of C$_n$H$_{2n}$O[C$_2$H$_3$(M)O]$_a$R' moieties, where M=H (from ethylene oxide) or Methyl (from propylene oxide), having weight average molecular weights of from about 700-2500 and wherein n is 1-4 and typically n=3, the value of "a" is in the range of 24 to 50 and more preferably 30 to 40 and where the EO/PO ratio is from 0.90 to 1.10 and more preferably from 1.0 to 1.05 and R' represents the acyl group —C(O)CH$_3$ and 2) a second polyether pendant R defined as —C$_n$H$_{2n}$O(C$_2$H$_4$O)$_a$R' moieties having weight average molecular weights of from about 2300-3200 and wherein n is 1-4 and typically n=3, the value of "a" is typically in the range of 15-20 and R' represents the acyl group C(O)CH$_3$. The range of the second siloxane is typically 2 wt. % to 6 wt. % and preferably from 3 wt. % to 5 wt. %.

d. A third siloxane-oxyalkylene copolymer surfactant (SSF-4) having the general formula MD$_x$D'$_y$M wherein M represents (CH$_3$)$_3$SiO$_{1/2}$ or R(CH$_3$)$_2$SiO$_{1/2}$, D represents (CH$_3$)$_2$SiO$_{2/2}$, D' represents (CH$_3$)RSiO$_{2/2}$, and a DP (defined as the degree of polymerization and equal to x+y+2) value of in the range from 50 to 90 and preferably from 60 to 80 and the x/y ratio from 5 to 10 and more preferably from 6 to 8 and two pendant R groups which are defined as: 1) a polyether-containing substituent selected from the group consisting of C$_n$H$_{2n}$O[C$_2$H$_3$(M)O]$_a$R' moieties, where M=H (from ethylene oxide) or Methyl (from propylene oxide), having weight average molecular weights of from about 750-1800 and wherein n is 1-4 and typically n=3, the value of "a" is in the range of 16 to 32 and more preferably 20 to 28 and where the EO/PO ratio is from 0.90 to 1.10 and more preferably from 1.0 to 1.05 and R' acyl group —C(O)CH$_3$ and 2) a second polyether pendant R defined as —C$_n$H$_{2n}$O[C$_2$H$_3$(M)O]$_a$R' moieties, where M=H (from ethylene oxide) or Methyl (from propylene oxide), having weight average molecular weights of from about 2500-3500 and wherein n is 1-4 and typically n=3, the value of "a" is in the range of 50-70 and more typically 54-64 and R' represents acyl group C(O)CH$_3$. The range of the third siloxane is typically 2 wt. % to 6 wt. % and preferably from 3 wt. % to 5 wt. %. The foregoing components can be combined using conventional equipment and processes.

The surfactants of the invention can comprise at least one diluent selected from the group consisting of dipropylene glycol (DPG), methyl esters of fatty acid mixtures from soybean oil, corn oil, sunflower oil, olive oil, canola oil, sesame oil, palm oil, tung oil, cotton seed oil, safflower oil, peanut oil, linseed oil, animal fats including fish, tallow, lard and methyl ester of rapeseed oil. Rapeseed methyl ester is typically made by trans-esterification of refined rapeseed oil with methanol. The ester mixture contains various fatty acids saturated and unsaturated with C$_{16}$ to C$_{22}$. Rapeseed is different from other typical fatty acids sources because of the higher content of erucic acid (C$_{22}$H$_{42}$O$_2$, Z-Docos-13-enoic acid). Diluents also include methyl esters of individual saturated and unsaturated fatty acids with chain lengths from C$_{12}$ to C$_{24}$ comprising lauric, myristic, palmitic, steric, arachidic, lignoceric, palmitoleic, oleic, erucic, linoleic, linolenic, and arachidonic.

The amount of diluent can range from about 10 wt. % to 40 wt. % and typically from about 15 wt. % to 30 wt. % and preferably from 20 wt. % to 25 wt. %.

The surfactants of the invention are employed in the manufacture of flexible polyurethane foam in the manner known to the art together with other components as defined below. The amount of surfactant can range from about 0.05 pphp to about 10 pphp.

Polyol Component

Polyurethanes are produced by the reaction of organic isocyanates with the hydroxyl groups in a polyol, typically a mixture of polyols. The polyol component of the reaction mixture includes at least a main or "base" polyol. Base polyols suitable for use in the invention include, as non-limiting examples, at least one member selected from the group consisting of polyether polyols. Polyether polyols include poly(alkylene oxide) polymers such as poly(ethylene oxide) and poly(propylene oxide) polymers and copolymers with terminal hydroxyl groups derived from polyhydric compounds, including diols and triols. Examples of diols and triols for reaction with the ethylene oxide or propylene oxide include at least one member selected from the group consisting of ethylene glycol, propylene glycol, 1,3-butanediol, 1,4-butanediol, 1,6-hexanediol, neopentyl glycol, diethylene glycol, dipropylene glycol, pentaerythritol, glycerol, diglycerol, trimethylol propane, and similar low molecular weight polyols. Other base polyol examples known in the art include polyhydroxy-terminated acetal resins, hydroxyl-terminated amines and hydroxyl-terminated polyamines. Examples of these and other suitable isocyanate-reactive materials may be found in U.S. Pat. No. 4,394,491; the disclosure of which is hereby incorporated by reference. Suitable polyols also include those containing tertiary amine groups than can catalyze the gelling and the blowing reaction of polyurethanes, for example those described in WO 03/016373 A1, WO 01/58976 A1; WO2004/060956 A1; WO03/016372 A1; and WO03/055930 A1; the disclosure of the foregoing is hereby incorporated by reference. Other useful polyols may include polyalkylene carbonate-based polyols and polyphosphate-based polyols. The amount of polyether polyol can range from about 20 to about 100 pphp of the foam formulation.

In one aspect of the invention, a single high molecular weight polyether polyol may be used as the base polyol. Alternatively, a mixture of high molecular weight polyether polyols, for example, mixtures of di- and tri-functional materials and/or different molecular weight or different chemical composition materials may be used. Such di- and tri-functional materials include, but are not limited to at least one member selected from the group consisting of polyethylene glycol, polypropylene glycol, glycerol-based polyether triols, trimethylolpropane-based polyether triols, and other similar compounds or mixtures, provided that they are ester-free. In some embodiments of the invention, at least about 50 wt % of the ester-free polyol component consists of one or more polyether polyols.

In addition to the base polyols described above, or instead of them, materials commonly referred to as "copolymer polyols" may be included in a polyol component for use according to the invention. Copolymer polyols may be used in polyurethane foams to increase the resistance of the foam to deformation, for example to improve the load-bearing properties of the foam. Depending upon the load-bearing requirements for the polyurethane foam, copolymer polyols may comprise from 0 to about 80 percent by weight of the total polyol content. Examples of copolymer polyols include, but are not limited to, graft polyols and polyurea modified polyols, both of which are known in the art and are commercially available.

Graft polyols are prepared by copolymerizing vinyl monomers, typically styrene and acrylonitrile, in a starting polyol. The starting polyol is typically a glycerol-initiated triol, and is typically end-capped with ethylene oxide (approximately 80-85% primary hydroxyl groups). Some of the copolymer grafts to some of the starting polyol. The graft polyol also contains homopolymers of styrene and acrylonitrile and unaltered starting polyol. The styrene/acrylonitrile solids content of the graft polyol typically ranges from about 5 wt % to about 45 wt %, but any kind of graft polyol known in the art may be used.

Polyurea modified polyols are formed by the reaction of a diamine and a diisocyanate in the presence of a starting polyol, with the product containing polyurea dispersion. A variant of polyurea modified polyols, also suitable for use, are polyisocyanate poly addition (PIPA) polyols, which are formed by the in situ reaction of an isocyanate and an alkanolamine in a polyol.

Useful polyester polyol include those produced when a dicarboxylic acid is reacted with an excess of a diol for example adipic acid or phathalic acid or phthalic anhydride with ethylene glycol or butanediol or reacting a lactone with an excess of a diol such as caprolactone with propylene glycol. Mannich polyols are also typically used in spray formulations. Mannich polyols are made by the condensation of phenols with aldehydes and amines to give polyols containing multiple hydroxyl groups (2 to 8) and tertiary amine centers. Polyester polyols can normally be present from about 0 to about 100 pphp.

Natural Oil Polyol Component

All or a portion of the polyols useful in the preparation of polyurethane foam from inexpensive and renewable resources are highly desirable to minimize the depletion of fossil fuel and other non-sustainable resources. Natural oils consist comprise triglycerides of saturated and unsaturated fatty acids. One natural oil polyol is castor oil, a natural triglyceride of ricinoleic acid which is commonly used to make polyurethane foam even though it has certain limitations such as low hydroxyl content. Other natural oils need to be chemically modified to introduce sufficient hydroxyl content to make them useful in the production of polyurethane polymers. There are two chemically reactive sites that can be considered when attempting to modify natural oil or fat into a useful polyol: 1) the unsaturated sites (double bonds); 2) the ester functionality. Unsaturated sites present in oil or fat can be hydroxylated via epoxidation/ring opening or hydroformilation/hydrogenation. Alternatively, trans-esterification can also be utilized to introduce OH groups in natural oil and fat. The chemical process for the preparation of natural polyols using epoxidation route involves a reaction mixture that requires epoxidized natural oil, a ring opening acid catalyst and a ring opener. Epoxidized natural oils include epoxidized plant-based oils (epoxidized vegetable oils) and epoxidized animal fats. The epoxidized natural oils may be fully or partially epoxidized and these oils include at least one member selected from the group consisting of soybean oil, corn oil, sunflower oil, olive oil, canola oil, sesame oil, palm oil, rapeseed oil, tung oil, cotton seed oil, safflower oil, peanut oil, linseed oil and combinations thereof. Animal fats include fish, tallow and lard. These natural oils are triglycerides of fatty acids which may be saturated or unsaturated with various chain lengths from $C_{12}$ to $C_{24}$. These acids can be: 1) saturated: lauric, myristic, palmitic, steric, arachidic and lignoceric; 2) mono-unsaturated: palmitoleic, oleic, 3) poly-unsaturated: linoleic, linolenic, arachidonic. Partially or fully epoxidized natural oil may be prepared when reacting peroxyacid under suitable reaction conditions. Examples of peroxyacids utilized in the epoxidation of oils have been described in WO 2006/116456 A1; the disclosure of which is hereby incorporated by reference. Ring opening of the epoxidized oils with alcohols, water and other compounds having one or multiple nucleophilic groups can be used. Depending on the reaction conditions oligomerization of the epoxidized oil can also occur. Ring opening yields natural oil polyol that can be used for the manufacture of polyurethane products. In the hydroformilation/hydrogenation process, the oil is hydroformylated in a reactor filled with a hydrogen/carbon monoxide mixture in the presence of a suitable catalyst (typically cobalt or rhodium) to form an aldehyde which is hydrogenated in the presence of cobalt or nickel catalyst to form a polyol. Alternatively, polyol form natural oil and fats can be produced by trans-esterification with a suitable poly-hydroxyl containing substance using an alkali metal or alkali earth metal base or salt as a trans-esterification catalyst. Any natural oil or alternatively any partially hydrogenated oil can be used in the transesterification process. Examples of oils include but are not limited to at least one member selected from the group consisting of soybean, corn, cottonseed, peanut, castor, sunflower, canola, rapeseed, safflower, fish, seal, palm, tung, olive oil or any blend. Any multifunctional hydroxyl compound can also be used such as lactose, maltose, raffinose, sucrose, sorbitol, xylitol, erythritol, mannitol, or any combination. The amount of natural oil polyol can range from about 0 to about 40 pphp of the foam formulation.

Organic Isocyanates

Suitable organic isocyanate compounds include, but are not limited to, at least one member from the group consisting of hexamethylene diisocyanate (HDI), phenylene diisocyanate (PDI), toluene diisocyanate (TDI), and 4,4'-diphenylmethane diisocyanate (MDI). In one aspect of the invention, 2,4-TDI, 2,6-TDI, or any mixture thereof is used to produce polyurethane foams. Other suitable isocyanate compounds are diisocyanate mixtures known commercially as "crude MDI." One example is marketed by Dow Chemical Company under the name PAPI, and contains about 60% of 4,4'-diphenylmethane diisocyanate along with other isomeric and analogous higher polyisocyanates. The isocyanate index can range from about 80 to about 500 depending on the type of foam formulation. For example, flexible foams have typically an isocyanate index of 80 to 120 while rigid foams such as those typically used in appliances, lamination and spray foam application can have indexes in the range of 100 to 500 depending on the application. The higher indexes are commonly used with trimerization catalyst to produce PIR foams normally used in foam laminates that require good fire performance.

Catalysts

The catalyst of the present invention comprises any tertiary amine that has been stored and maintained in equilibrium with a gas phase rich in an inert gas (e.g., a tertiary amine produced in accordance with the inventive method). Tertiary amine catalysts can contain an isocyanate-reactive group or not. Isocyanate reactive groups comprise primary amine, secondary amine, hydroxyl group, amide or urea. Tertiary amine catalysts containing isocyanate reactive groups include both gelling and blowing catalysts. Exemplary gelling catalysts include at least one member selected from the group consisting of N,N-bis(3-dimethylaminopropyl)-N-isopropanolamine; N,N-dimethylaminoethyl-N'-methyl ethanolamine (DABCO® T, Air Products and Chemicals, Inc. of Allentown, Pa.); N,N,N'-trimethylaminopropyl ethanolamine (POLYCAT® 17, by Air Products and Chemicals, Inc.), N,N-dimethylethanolamine (DABCO® DMEA); N,N-dimethyl-N',N'-2-hydroxy(propyl)-1,3-propylenediamine; dimethylaminopropylamine (DMAPA); (N,N-dimethylaminoethoxy)ethanol, methyl-hydroxy-ethyl-piperazine, bis(N,N-dimethyl-3-aminopropyl)amine (POLYCAT® 15), N,N-dimethylaminopropyl urea (DABCO® NE1060, DABCO® NE1070), N,N'-bis(3-dimethylaminopropyl) urea (DABCO® NE1070, DABCO® NE1080), bis(dimethylamino)-2-propanol, N-(3-aminopropyl)imidazole, N-(2-hydroxypropyl)imidazole, and N-(2-hydroxyethyl) imidazole.

Exemplary blowing catalysts containing isocyanate reactive groups include at least one member selected from the group consisting of 2-[N-(dimethylaminoethoxyethyl)-N-methylamino]ethanol, N,N-dimethylaminoethyl-N'-methyl-N'-ethanol (DABCO®-T), dimethylaminoethoxyethanol and N,N,N'-trimethyl-N'-3-aminopropyl-bis(aminoethyl) ether (DABCO® NE300).

The catalyst may also comprise tertiary amines that are highly volatile and not isocyanate-reactive. Suitable volatile gelling catalysts may include, for example, at least one member selected from the group consisting of diazabicyclooctane (triethylenediamine), supplied commercially as DABCO®33-LV catalyst, tris(dimethyalminopropyl)amine (Polycat® 9), dimethylaminocyclohexylamine (Polycat® 8) and bis(dimethylaminopropyl)-N-methylamine (Polycat® 77), N,N-dimethylcyclohexylamine (Polycat-8, Air Products and Chemicals, Inc. of Allentown, Pa.), N-Methyldicyclohexylamine (Polycat-12, Air Products and Chemicals, Inc. of Allentown, Pa.). Suitable volatile blowing catalysts include, for example, at least one member selected from the group consisting of bis-dimethylaminoethyl ether, commercially supplied as DABCO® BL-11 catalyst by Air Products and Chemicals, Inc.; as well as pentamethyldiethylenetriamine (POLYCAT® 5, Air Products and Chemicals, Inc.), hexamethyltriethylenetetramine, heptamethyltetraethylenepentamine and related compositions; higher permethylated polyamines; 2-[N-(dimethylaminoethoxyethyl)-N-methylamino]ethanol and related structures; alkoxylated polyamines; imidazole-boron compositions; or amino propyl-bis(amino-ethyl)ether compositions. The catalyst compositions may also include other components, for example transition metal catalysts such as organotin compounds.

Typically, the loading of non-fugitive tertiary amine catalyst(s) for making foam according to the invention will be in the range of about 0.1 to about 20 pphp, more typically about 0.1 to about 10 pphp, and most typically about 0.1 to about 5 pphp. However, any effective amount may be used. The term "pphp" means parts per hundred parts polyol. The amount of volatile amine catalyst in the foam formulation can range from about 0.05 to about 20 pphp.

Blowing Agents

Polyurethane foam production may be aided by the inclusion of a blowing agent to produce voids in the polyurethane matrix during polymerization. Any blowing agent known in the art may be used. Suitable blowing agents include compounds with low boiling points which are vaporized during the exothermic polymerization reaction. Such blowing agents are generally inert and therefore do not decompose or react during the polymerization reaction. Examples of inert blowing agents include, but are not limited to, at least one member selected from the group consisting of carbon dioxide, chlorofluorocarbons, hydrogenated fluorocarbons, hydrogenated chlorofluorocarbons, fluoroolefins, chlorofluoroolefins, hydrofluoroolefins, hydrochlorfluoro olefins, acetone, and low-boiling hydrocarbons such as cyclopentane, isopentane, n-pentane, and their mixtures. Other suitable blowing agents include compounds, for example water, that react with isocyanate compounds to produce a gas. The amount of blowing agent is typically from about 0 (water blown) to about 80 pphp. Water (blow foam by reacting with isocyanate making $CO_2$) can be present in the range from about 0 (if a BA is included) to about 60 pphp (a very low density foam) and typically from about 1.0 pphp to about 10 pphp and, in some cases, from about 2.0 pphp to about 5 pphp.

Other Optional Components

A variety of other components or ingredients may be included in the formulations for making foams according to the invention. Examples of optional components include, but are not limited to, at least one member selected from the group consisting of additional cell stabilizers, crosslinking agents, chain extenders, pigments, fillers, flame retardants, auxiliary urethane gelling catalysts, auxiliary urethane blowing catalysts, transition metal catalysts, and combinations of any of these. Additional cell stabilizers can used in an amount from about 0.1 to about 20 pphp and typically from about 0.1 to about 10 pphp and, in some cases, from about 0.1 to about 5.0 pphp. Fire retardants can be used in an amount from about 0 to about 20 pphp and from about 0 to about 10 pphp and from about 0 to about 5 pphp.

Crosslinking agents include, but are not limited to, at least one member selected from the group consisting of low-molecular weight compounds containing at least two moieties selected from hydroxyl groups, primary amino groups, secondary amino groups, and other active hydrogen-containing groups which are reactive with an isocyanate group. Crosslinking agents include, for example, at least one member selected from the group consisting of polyhydric alcohols (especially trihydric alcohols, such as glycerol and trimethylolpropane), polyamines, and combinations thereof. Non-limiting examples of polyamine crosslinking agents include diethyltoluenediamine, chlorodiaminobenzene, diethanolamine, diisopropanolamine, triethanolamine, tripropanolamine, 1,6-hexanediamine, and combinations thereof. Typical diamine crosslinking agents comprise twelve carbon atoms or fewer, more commonly seven or fewer. The amount of crosslinking agent typically ranges from about 0.1 pphp to about 20 pphp Examples of chain extenders include, but are not limited to, compounds having hydroxyl or amino functional group, such as glycols, amines, diols, and water. Specific non-limiting examples of chain extenders include at least one member selected from the group consisting of ethylene glycol, diethylene glycol, propylene glycol, dipropylene glycol, 1,4-butanediol, 1,3-butanediol, 1,5-pentanediol, neopentyl glycol, 1,6-hexanediol, 1,10-decanediol, 1,12-dodecanediol, ethoxylated hydroquinone, 1,4-cyclohexanediol, N-methylethanolamine, N-methylisopropanolamine, 4-aminocyclohexanol, 1,2-diaminoethane, 2,4-toluenediamine, or any mixture thereof. The amount of chain extender can range from about 0 pphp (no chain extender) to about 20 pphp.

Pigments may be used to color code the polyurethane foams during manufacture, for example to identify product grade or to conceal yellowing. Pigments may include any suitable organic or inorganic pigments known in the polyurethane art. For example, organic pigments or colorants include, but are not limited to, at least one member selected from the group consisting of azo/diazo dyes, phthalocyanines, dioxazines, and carbon black. Examples of inorganic pigments include, but are not limited to, titanium dioxide, iron oxides, or chromium oxide. The amount of any pigment typically ranges from about 0 pphp to about 15 pphp.

Fillers may be used to increase the density and load bearing properties of polyurethane foams. Suitable fillers include, but are not limited to, barium sulfate or calcium carbonate. The amount of any filler typically ranges from about 0 pphp to about 30 pphp Flame retardants may be used to reduce the flammability of polyurethane foams. For example, suitable flame retardants include, but are not limited to, chlorinated phosphate esters, chlorinated paraffins, or melamine powders. The amount of flame retardant can be used in an amount from about 0 to about 20 pphp and from about 0 to about 10 pphp and from about 0 to about 5 pphp. A general polyurethane flexible slabstock foam formulation containing the silicone surfactants according to the invention would comprise the following components in parts by weight:

TABLE 1

General Flexible Slabstock Foam Formulation

| Component | PPHP |
|---|---|
| Polyether Polyol | 100 |
| Blowing Agent | 1.0–10.0 |
| Amines 2 | 0.1–5.0 |
| Metal Catalyst | 0.05–0.50 |
| Silicone Surfactant | 0.6–1.5 |
| Water (add) | 0.20–10.0 |
| Isocyanate Index | 75–120 |

Hand Mix Evaluations

Hand mix experiments were conducted using the following procedure. Formulations were blended together for approximately 10 seconds using a mechanical mixer equipped with a 7.6 cm diameter high shear mixing blade, rotating at 5000 rpm. Mondur TD-80 (an 80/20 2, 4/2,6 isomer blend of toluene diisocyanate) or modified MDI was added to the premix at the correct stoichiometric amount for the reported index of each foam. The mixture was blended together with Premier Mill Corporation Series 2000, Model 89, and dispersed for approximately five seconds. The foaming mixture was transferred to 5 gallon cylindrical bucket and allowed to free rise while data was recorded.

Preparation of Foams

The amount of polyisocyanate used in polyurethane formulations according to the invention is not limited, but it will typically be within those ranges known to those of skill in the art. An exemplary range is given in table 1, indicated by reference to "NCO Index" (isocyanate index). As is known in the art, the NCO index is defined as the number of equivalents of isocyanate, divided by the total number of equivalents of active hydrogen, multiplied by 100. The NCO index is represented by the following formula. NCO index= [NCO/(OH+NH)]*100.

Certain aspects of the invention are demonstrated by the following Examples which are provided only to illustrate certain aspects of the invention and shall not limit the scope of the claims appended hereto.

Example 1

Preparation of Various Silicone Surfactant Mixtures with Various Diluents

Various inventive silicone surfactants to manufacture flexible foam were mixed with various diluents including dipropylene glycol (DPG) and the methyl ester of rapeseed oil. Rapeseed methyl ester is typically made by transesterification of refined rapeseed oil with methanol. The ester mixture contains various fatty acids saturated and unsaturated with $C_{16}$ to $C_{22}$. Rapeseed is different from other typical fatty acids sources because of the higher content of erucic acid ($C_{22}H_{42}O_2$; Z-Docos-13-enoic acid).

TABLE 1

General Flexible Slabstock Foam Formulation

| Component Type raw material | Product name | OH# | Standard A |
|---|---|---|---|
| Polyol 1 | Laprol ®4003 | 48 | 100.00 |
| Blowing Agent | Methylenechloride | — | 5.00 |
| Amines 1 | Dabco ®33LV | 560 | 0.10 |
| Amines 2 | Dabco ®BL11 | 276 | 0.05 |
| Metal Catalyst | Dabco ®T-9 | — | 0.20 |
| Silicone Surfactant | Varied | — | 0.80 |
| Water (total) | — | 6230 | 4.20 |
| Isocyanate 1 | Desmodur ®T-80 | — | 54.80 |
| NCO(%) | — | — | 32.0 |

Laprol ®4003 is a conventional flexible slabstock polyether polyol with functionality = 3 and OH# = 48. Dabco ®33LV is a 33% solution of triethylenediamine in DPG available form Air Products & Chemical. Dabco ®BL11 is a 70% solution of bis(dimethylaminoethyl) ether in DPG. Dabco ®T-9 is a tin(II) octoate available from Air Products and Chemicals. Desmodui ®T-80 is a commercially available toluene diisocyanate with 2,4-isomer (80%) and 2,6-isomer (20%) available from Covestro.

TABLE 2

Compositional Characteristics of Various Silicone Surfactants (SSF)

| Surfactant | Blend | DP | D/D' | EO/PO | Capped | Diluted |
|---|---|---|---|---|---|---|
| SSF-1 | No | 120 | 10.8 | 18/18 | Yes | No |
| SSF-2 | No | 194 | 7.35 | 12/0, 18/18 | Yes | No |
| SSF-3 | No | 101 | 15.5 | 21/21 | Yes | No |
| SSF-4 | No | 70 | 7.99 | 12/12, 30/30 | Yes | No |
| SSF-5 | No | 120 | 10.8 | 12/12, 30/30 | Yes | No |

SSF-6 is a blend of 50% SSF-2 with 50% SSF-4; SSF-7 is a blend of 40% SSF-2 and 40% SSF-4 with 20% DPG.
DP means degree of polymerization and DP = x + y + 2.
D/D' is the ratio or fraction of siloxanes without polyether pendant to the fraction of siloxanes with polyether pendants.
EO/PO is the molar ratio of ethylene oxide to propylene oxide; for SSF-1 the EO/PO ratio of 18/18 means a single polyether pendant with 18 —CH2CH2—O groups and 18 —CH2CHMe—O groups randomly distributed across the pendant polyether chain; for SSF-2 EO/PO = 12/0 and 18/18 means that there are two polyether pendants: one with 12 —CH2CH2—O groups and no —CH2CHMe—O groups and another polyether pendant with 18 —CH2CH2—O groups and 18 —CH2CHMe—O groups randomly distributed across the pendant polyether chain. Capped means that ending OH groups in polyether chains are esterified with the acyl group —CO—Me.

TABLE 3

Blends of Various Silicone Surfactants (SSF) with DPG and RME

| Example | RM-A | Wt. % | RM-B | Wt. % | RM-C | Wt. % | RM-D | Wt. % |
|---|---|---|---|---|---|---|---|---|
| 0 | SSF-1 | 55 | SSF-3 | 20 | DPG | 25 | DPG | 0 |
| 1 | SSF-1 | 45 | SSF-2 | 15 | SSF-4 | 15 | PE | 25 |
| 2 | SSF-1 | 35 | SSF-5 | 25 | SSF-2 | 15 | DPG | 25 |
| 3 | SSF-2 | 10 | SSF-1 | 75 | SSF-3 | 0 | DPG | 15 |
| 4 | SSF-3 | 5 | SSF-1 | 80 | SSF-4 | 0 | DPG | 15 |
| 5 | SSF-2 | 5 | SSF-1 | 80 | SSF-4 | 0 | DPG | 15 |
| 6 | SSF-2 | 0 | SSF-1 | 80 | SSF-5 | 5 | DPG | 15 |
| 7 | SSF-2 | 20 | SSF-1 | 45 | SSF-5 | 15 | DPG | 20 |
| 8 | SSF-2 | — | SSF-1 | 75 | SSF-4 | 10 | DPG | 15 |
| 9 | SSF-1 | 75 | SSF-5 | 5 | SSF-6 | 5 | DPG | 15 |
| 10 | SSF-1 | 72.5 | SSF-5 | 5 | SSF-6 | 7.5 | MPD | 15 |
| 11 | SSF-1 | 50 | SSF-5 | 15 | SSF-2 | 20 | RME | 15 |
| 12 | SSF-1 | 50 | SSF-5 | 15 | SSF-2 | 20 | DPG | 15 |
| 13 | SSF-1 | 60 | SSF-5 | 10 | SSF-2 | 15 | RME | 15 |
| 14 | SSF-1 | 75 | SSF-5 | 15 | — | 0 | RME | 10 |
| 15 | SSF-1 | 85 | SSF-3 | 5 | — | 0 | RME | 10 |
| 16 | SSF-1 | 84.2 | SSF-7 | 5.3 | — | 0 | RME | 10.5 |
| 17 | SSF-1 | 74 | SSF-7 | 11 | — | 0 | RME | 15 |
| 18 | SSF-1 | 70 | SSF-7 | 10 | — | 0 | RME | 20 |
| 19 | SSF-1 | 65 | SSF-7 | 10 | — | 0 | RME | 25 |
| 20 | SSF-1 | 50 | SSF-7 | 20 | — | 0 | RME | 30 |

SSF-1 to 7 are as defined in Table 2; RME is the methyl ester of conventional rapeseed oil or the methyl ester of the rapeseed oil which is not used for human consumption (canola oil).
DPG is dipropylene glycol, MPD is 2-methyl-1,3-propanediol and PE is a polyethylene glycol with average MW = 200

TABLE 4

Foam Produced Using Blends of Various Silicone Surfactants (SSF) with DPG and RME

| Product | Rise time (s) [95%] | Rise height [mm] | Settling [%] | Density [kg/m³] T/M/B | Airflow [l/min] (T/M/B) | Comments |
|---|---|---|---|---|---|---|
| Desired | ≤120 | ≥230 | <0.9 | Top = 20 ± 2 Middle = 21 ± 2 Bottom = 23 ± 2 | Top = 100-160 Middle = 75-130 Bottom = 65-115 | Best |
| SSF-6 | 116 | 231 | 5.5 | 21.2/22.0/22.5 | 172/141/89/ | Slow Rise/Shrinkage |
| SSF-1 | 108 | 246 | 1.8 | 19.9/20.5/22.1 | 85/90/87 | Shrinkage |
| 0 | Collapse | ND | ND | ND | ND | Collapse |
| 2 | Collapse | ND | ND | ND | ND | Collapse |
| 3 | 130 | 208 | 8.2 | ND | ND | Shrinkage |
| 4 | 112 | 209 | 9.3 | ND | ND | Shrinkage |
| 5 | 114 | 231 | 3.0 | 19.1/20.7/23.4 | 134/99/89 | Shrinkage |
| 6 | 115 | 212 | 3.5 | 22.1/21.3/23.7 | 145/132/110 | Shrinkage |
| 7 | 103 | 225 | 0.9 | 20.1/19.9/21.5 | 123/130/124 | Too Open |
| 8 | 119 | 208 | 4.2 | 22.1/23.8/24.1 | 122/110/89 | Shrinkage |
| 7 | 126 | 239 | 0.4 | 20.1/21.0/22.0 | 80/67/49 | Poor Air Flow |
| 8 | 128 | 236 | 0.8 | 20.4/21.4/22.9 | 92/90/50 | Poor Air Flow |
| 9 | 120 | 233 | 1.6 | 21.2/21.8/23.8 | 60/32/45 | Poor Air Flow |
| 10 | 122 | 226 | 3.8 | 22.2/23.0/25.4 | 72/45/53 | Poor Air Flow |
| 11 | 127 | 208 | 2.9 | 23.1/24.4/32.2 | 70/39/35 | Poor Air Flow |
| 12 | 170 | 226 | 0.7 | 20.2/split/22.9 | 60/split/67 | Splitting |
| 13 | 118 | 222 | 3.5 | 23.4/23.8/30.0 | 30/45/30 | Poor Air Flow |
| 14 | 117 | 217 | 2.4 | 22.0/22.6/26.5 | 24/67/45 | Poor Air Flow |
| 15 | 124 | 230 | 0.1 | 20.8/21.3/23.4 | 80/50/97 | Poor Air Flow |
| 16 | 114 | 246 | 0.6 | 19.0/19.2/22.9 | 90/75/30 | Poor Air Flow |
| 17 | 108 | 245 | 0.7 | 19.5/21.2/22.8 | 85/78/45 | Poor Air Flow |
| 18 | 105 | 248 | 0.8 | 19.8/20.7/22.5 | 100/78/68 | Best |
| 19 | 118 | 235 | 0.4 | 19.4/20.2/22.3 | 140/115/96 | Best |
| 20 | 110 | 240 | 0.8 | 20.0/20.6/23.9 | 140/100/86 | Good |

Hand mix experiments were conducted using the following procedure. All components shown in formulation of Table 1 except isocyanate were blended together for approximately 10 seconds using a mechanical mixer equipped with a 7.6 cm diameter high shear mixing blade, rotating at 5000 rpm. Mondur TD-80 (an 80/20 2, 4/2,6 isomer blend of toluene diisocyanate)| was added to the premix at the correct stoichiometric amount according to formulation 1. The mixture with isocyanate was mixed together with the same mechanical stirrer (Premier Mill Corporation Series 2000, Model 89) for approximately five seconds. The foaming mixture was transferred to 5 gallon cylindrical bucket and allowed to free rise while data was recorded as described below. The FOMAT standard software generates both height versus time plots and velocity versus time plots. These plots are useful for comparing the relative reactivity of different surfactant formulations allowing the measurement of rise height, rise time and setting. When combinations are tested in flexible slabstock formulations according to formulation in Table 1 then the Rise Time (defines as the time in seconds to reach 95% of its height), Rise height (mm), and setting (%) can be measured with a FOMAT device. Densities (Kg/m3) for top, middle and bottom layers were measured by ASTM D3574 Test A method and air flows (litter/min) are for top layer, middle layer and bottom layer are measured by ASTM D3574 Test G.

Example 2

Preparation of Flexible Slabstock Foam Using Silicone Surfactant Mixtures with Various Fatty Acid Esters Commercial fatty acid esters including the methyl fatty acid esters of the carboxylic acid mixtures obtained from soybean oil, corn oil, sunflower oil, olive oil, canola oil, sesame oil, palm oil, rapeseed oil, tung oil, cotton seed oil, safflower oil, peanut oil, linseed oil, animal fats including fish, tallow and lard are combined with SSF-1 and SSF-7. The proportions of the mixture is as follows: SSF-1 60-80 wt. %+SSF-7 (5-20 wt. %)+fatty acid ester (10-35 wt. %). Formation of foam can be evaluated by comparing the foam height versus time for different surfactants. Foam height profile can be measured by automated rate of rise equipment, utilizing free-rise cup foam samples with a FOMAT sonar rate-of-rise device, model no V3.5 (hereafter referred to as a "ROR"). The FOMAT device comprises a sonar sensor that measures and records the height in millimeters (mm) of the rising foam sample versus time in seconds (s), directly after mixing all components of the formulation. The FOMAT standard software generates both height versus time plots and velocity versus time plots. These plots are useful for comparing the relative reactivity of different surfactant formulations allowing the measurement of rise height, rise time and setting. When combinations are tested in flexible slabstock formulations according to formulation in Table 1 then the Rise Time (defined as the time in seconds to reach 95% of its height) is <120 seconds, Rise height (mm) is >230, and setting (%)<0.9 according to measurements provided by a FOMAT device, Densities (Kg/m3) for top, middle and bottom layers are 20±2, 21±2, 23±2 respectively (as measured by ASTM D3574 Test A) and air flows (liter/min) are for top layer, middle layer and bottom layer 100-160, 75-130 and 65-115 respectively (measured by ASTM D3574 Test G).

Example 3

Preparation of Flexible Slabstock Foam Using Silicone Surfactant Mixtures with Carboxylic Fatty Acid Esters Fatty acids esters are prepared with the following saturated and unsaturated acids with chain lengths from $C_{12}$ to $C_{24}$: a) lauric, myristic, palmitic, steric, arachidic and lignoceric—saturated; b) palmitoleic, oleic, erucic—monounsaturated; c) poly-unsaturated: linoleic, linolenic, arachidonic by esterification of the corresponding acids with methanol.

The methyl fatty acid esters are mixed with silicone surfactants according to the following proportions: SSF-1 60-80 wt. %+SSF-7 (5-20 wt. %)+fatty acid ester (10-35 wt. %). Testing these combinations in flexible slabstock formulations according to formulation in Table 1 yields the following results: rise time (defined as the time in seconds to reach 95% of its height) is <120 seconds, rise height (mm) is >230, setting (%)<0.9, densities (Kg/m3) for top, middle and bottom layers are 20±2, 21±2, 23±2 respectively and air flows (litter/min) are for top layer, middle layer and bottom layer 100-160, 75-130 and 65-115 respectively.

Thus, in Table 4 products 18, 19 and 20 showed optimum combinations of rapeseed methyl ester (20-35% rapeseed methyl ester contant) in combinations with SSF-1 and SSF-7 for which best foam kinetics, density distribution, cell opening and air flow was observed.

While the invention has been described with reference to certain aspects or embodiments, it will be understood by those skilled in the art that various changes may be made and equivalents may be substituted for elements thereof without departing from the scope of the invention. In addition, many modifications may be made to adapt the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A composition comprising siloxane-oxyalkylene copolymers, at least one alkyl ester of a fatty acid comprising a methyl ester of rapeseed oil, and dipropylene glycol; wherein the siloxane-oxyalkylene copolymers have the general formula $MD_xD'_yM$ wherein M in each instance represents $(CH_3)_3SiO_{1/2}$ or $R(CH_3)_2SiO_{1/2}$, D represents $(CH_3)_2SiO_{2/2}$, D' represents $(CH_3)RSiO_{2/2}$, R in each instance is a polyether-containing substituent, the value of x+y is from 50 to 220, the ratio x/y is from 5 to 15 inclusive, and wherein the siloxane-oxyalkylene copolymers comprise
   a) a first siloxane-oxyalkylene copolymer with a DP in the range of 110-130, a D/D' in the range of 9-11, and an EO/PO molar ratio in the range of 1.0-1.05;
   b) a second siloxane-oxyalkylene copolymer with a DP in the range of 190-210, a D/D' in the range of 6-8, and an EO/PO molar ratio in the range of 1.0-1.05; and;
   c) a third siloxane-oxyalkylene copolymer with a DP in the range of 60-80, a D/D' in the range of 6-8, and an EO/PO molar ratio in the range of 1.0-1.05.

2. The composition of claim 1 wherein the siloxane-oxyalkylene copolymers include at least one siloxane-oxyalkylene copolymer comprising one pendant R moiety defined as $C_nH_{2n}O(C_2H_4O)_a(C_3H_6O)_bR^1$ having a weight average molecular weight of from about 1400-2000 and wherein n is 1-4, the value of a is in the range of 12-22, the value of b is in the range of 12-22, and R' is the acyl group $C(O)CH_3$.

3. The composition of claim 1 wherein the siloxane-oyxalkylene copolymers include at least one siloxane-oxy-alkylene copolymer comprising two pendant R moieties defined as $C_nH_{2n}O(C_2H_4O)_a(C_3H_6O)_bR'$ having a weight average molecular weight of from about 1000-3500 and wherein n is 1-4, the value of a is in the range of 8-40, the value of b is in the range of 8-40, and R' is the acyl group $C(O)CH_3$.

4. The composition of claim 1 wherein the first siloxane-oxyalkylene copolymer comprises one pendant R moiety defined as $C_nH_{2n}O[C_2H_3(M)O]_aR'$, wherein M in the moiety $C_nH_{2n}O[C_2H_3(M)O]_aR'$ is H from ethylene oxide or methyl from propylene oxide, wherein the $C_nH_{2n}O[C_2H_3(M)O]_aR'$ moiety has a weight average molecular weight of from about 700-2500 and wherein n is 1-4, the value of a is in the range of 24-50, and R' is the acyl group $C(O)CH_3$.

5. The composition of claim 1 wherein the second siloxane-oxyalkylene copolymer comprises two pendant R moieties, wherein the first pendant R moiety is defined as $C_nH_{2n}O[C_2H_3(M)O]_aR'$, wherein M in the moiety $C_nH_{2n}O[C_2H_3(M)O]_aR'$ is H from ethylene oxide or methyl from propylene oxide, wherein the $C_nH_{2n}O[C_2H_3(M)O]_aR'$ moiety has a weight average molecular weight of from about 700-2500 and wherein n is 1-4, the value of a is in the range of 24-50, and R' is the acyl group $C(O)CH_3$, and the second pendant R moiety is defined as —$C_nH_{2n}O(C_2H_4O)_aR'$ having a weight average molecular weight of from about 2300-3200 and wherein n is 1-4, the value of a ace is in the range of 15-20, and R' is the acyl group $C(O)CH_3$.

6. The composition of claim 1 wherein the third siloxane-oxyalkylene copolymer comprises two pendant R moieties, wherein the first pendant R moiety is defined as $C_nH_{2n}O[C_2H_3(M)O]_aR'$, wherein M in the moiety $C_nH_{2n}O[C_2H_3(M)O]_aR'$ is H from ethylene oxide or methyl from propylene oxide, wherein the $C_nH_{2n}O[C_2H_3(M)O]_aR'$ moiety has a weight average molecular weight of from about 750-1800 and wherein n is 1-4, the value of a is in the range of 16-32, and R' is the acyl group $C(O)CH_3$, and the second pendant R moiety is defined as —$C_nH_{2n}O[C_2H_3(M)O]_aR'$, wherein M in the moiety $C_nH_{2n}O[C_2H_3(M)O]_aR'$ is H from ethylene oxide or methyl from propylene oxide, wherein the —$C_nH_{2n}O[C_2H_3(M)O]_aR'$ moiety has a weight average molecular weight of from about 2500-3500 and wherein n is 1-4, the value of a is in the range of 50-70, and R' is the acyl group $C(O)CH_3$.

7. The composition of claim 1 further comprising at least one alkyl ester of a fatty acid represented by the general formula Z—COO—Y wherein Z is a saturated or unsaturated $C_{10-24}$ alkyl or alkylene group, and Y is a $C_{1-6}$ alkyl group, alkylene group, linear group or branched group.

8. The composition of claim 1 further comprising at least one member selected from the group consisting of at least one polyol, at least one catalyst and at least one blowing agent.

9. A method for making a polyurethane foam comprising contacting the composition of claim 8 with at least one isocyanate.

10. A polyurethane foam made by the method of claim 9.

11. The composition of claim 1 wherein the first siloxane-oxyalkylene copolymer is 50-70 wt % of the composition; the combination of the second siloxane-oxyalkylene copolymer, the third siloxane-oxyalkylene copolymer and dipropylene glycol is 10-20 wt % of the composition; and the methyl ester of rapeseed oil is 20-30 wt % of the composition.

* * * * *